United States Patent [19]
Martin et al.

[11] Patent Number: 5,415,786
[45] Date of Patent: May 16, 1995

[54] PROCESS FOR TREATING WATER WITH OZONE

[75] Inventors: Nathalie Martin, Paris, France; Philippe Serpry, Cincinnati, Ohio

[73] Assignee: Trailigaz-Compagnie Generale de l'Ozone, Garges le Gonesse, France

[21] Appl. No.: 82,423

[22] Filed: Jun. 28, 1993

[30] Foreign Application Priority Data

Jun. 29, 1992 [FR] France .................. 92 07982

[51] Int. Cl.⁶ .............................. C02F 1/78
[52] U.S. Cl. ........................ 210/760; 210/604
[58] Field of Search .................. 210/760, 604

[56] References Cited

U.S. PATENT DOCUMENTS

| | | | |
|---|---|---|---|
| 3,748,262 | 7/1973 | Lee et al. | 210/760 |
| 4,132,637 | 1/1979 | Key et al. | 210/604 |
| 4,352,740 | 10/1982 | Grader et al. | |
| 4,865,749 | 9/1989 | Yoshida | 210/760 |

FOREIGN PATENT DOCUMENTS

| | | | |
|---|---|---|---|
| 3-296490 | 12/1991 | Japan | 210/760 |
| 662553 | 10/1987 | Switzerland | |

OTHER PUBLICATIONS

Patent Abstracts of Japan, vol. 13, No. 69 (C-569) Feb. 16, 1989 & JP-A-63 258 693 (Yasunobu Yoshida) Oct. 26, 1988.

*Primary Examiner*—Wilbur Bascomb, Jr.
*Attorney, Agent, or Firm*—Sughrue, Mion, Zinn, Macpeak & Seas

[57] ABSTRACT

Process for treating, especially waters to be made drinkable, with ozone in a reactor (2), especially with a bubble column, in which ozone is generated (in 1) in a gas enriched in oxygen containing at least 70% of oxygen by volume, to produce an ozonised gas containing more than 2%, especially from 2% to 20%, of ozone by weight, in which the said ozonised gas is diluted by means of a secondary fluid and the treatment is carried out by means of the diluted ozonised gas.

Another subject of the invention is a plant for the use of the process according to the invention, comprising an ozoniser (1) generating an ozonised gas, at least one reactor (2) for treatment with ozone, and a supply pipe (3) connecting the outlet of the ozoniser with the inlet of the reactor, in which means (4, 5; 15, 16), for injecting a secondary fluid into the said supply pipe (3), are additionally provided.

7 Claims, 1 Drawing Sheet

PROCESS FOR TREATING WATER WITH OZONE

BACKGROUND OF THE INVENTION

The present invention relates to treatment with ozone, especially of a fluid, especially of waters to be made drinkable.

The conventional ozonisation processes comprise the injection under pressure of a gas containing ozone into a treatment reactor or vessel containing, for example, the fluid to be treated, the undissolved gases being recovered at the column vents, and expelled to atmosphere after optional destruction of the ozone, or are recycled.

These processes are, for example, used conventionally with a diffusion system of bubble column type having porous diffusers. The flowrate of the injected gas leads to homogenisation of the concentrations of dissolved gas.

There is additionally known a process in which recycling of the gas is carried out between the outlet of a contactor and the inlet of the ozoniser, in order to limit operating costs. After destruction of the ozone contained in the air and then desiccation, the gas is conveyed to the ozoniser where fresh oxygen is introduced.

One disadvantage of this process is that the gas forced back at the reactor vents does not contain solely oxygen and ozone but also, among others, nitrogen and water. The problem which was then posed was the necessity of working at a high oxygen concentration; this then involved not insignificant purge flowrates. These purge flowrates depend on the gases absorbed or desorbed at the reactor outlet.

U.S. Pat. No. 4,352,740 describes a process for ozonising a flow of water in which a gas containing at least 70% of oxygen is conveyed into the ozoniser, generating an ozone content of the order of 4 to 8%, the gas thus obtained is then injected into the waste waters and the ozone-poor gas is released to atmosphere at the outlet of the reactor for treating the flow of water, after passing through an ozone destroyer.

As a result of the high concentration of oxygen and ozone in the gas at the inlet of the reactor for treating water, the disadvantage of this process consists in that the flowrate of ozonisation gas is very low with respect to the flowrate of the fluid to be treated, which does not make it possible to obtain homogeneous diffusion of the ozonisation gas in the fluid to be treated, and thus good mixing of the fluid and the gas, in particular when conventional columns for the ozonisation of water, of bubble column type, are used, and for this reason does not make it possible to carry out an optimised treatment of the fluid.

SUMMARY OF THE INVENTION

The present invention makes it possible to retain the advantages of the process described in U.S. Pat. No. 4,352,370 while overcoming the disadvantages mentioned.

The subject of the invention is thus a process for treating with ozone, especially a fluid such as waters to be made drinkable, in a reactor, especially a bubble column, in which ozone is generated in a gas enriched in oxygen containing at least 70% of oxygen by volume, to produce an ozonised gas containing more than 2%, and especially from 2 to 20%, of ozone by weight, characterised in that the said ozonised gas is diluted by means of a secondary fluid and the treatment is carried out by means of the diluted ozonised gas.

In a first implementational variant of the process according to the invention, the secondary fluid essentially comprises part or all of the vent gas from the said reactor.

There is thus obtained a recycled ozonised fluid enriched in ozone by the introduction of fresh ozonised gas.

Advantageously, in this variant, part of the vent gas from the reactor is recycled in order to dilute the ozonised gas, the remainder of this vent gas being discharged from the plant, preferably after treatment with an ozone destroyer.

In a second implementational variant of the process according to the invention, the secondary fluid consists essentially of a non-ozonised gas, especially of atmospheric air.

Another subject of the invention is a plant for treating with ozone, especially waters to be made drinkable, comprising an ozoniser generating an ozonised gas, at least one reactor for treating the said fluid and a supply pipe connecting the outlet of the ozoniser to the inlet of the reactor, characterised in that it additionally contains means for injecting a secondary fluid into the said supply pipe.

The invention will be described below in more detail with reference to the appended figures in which:

DESCRIPTION OF PREFERRED EMBODIMENT

Figure 1:
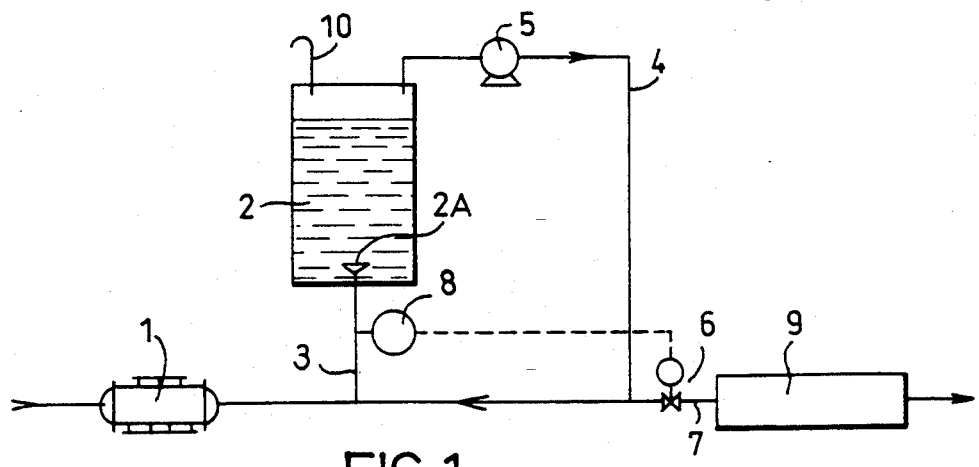
FIG. 1 represents the diagram of a plant for the use of the process according to the invention in which the secondary fluid essentially comprises vent gas from the ozonisation reactor.
Figure 2:
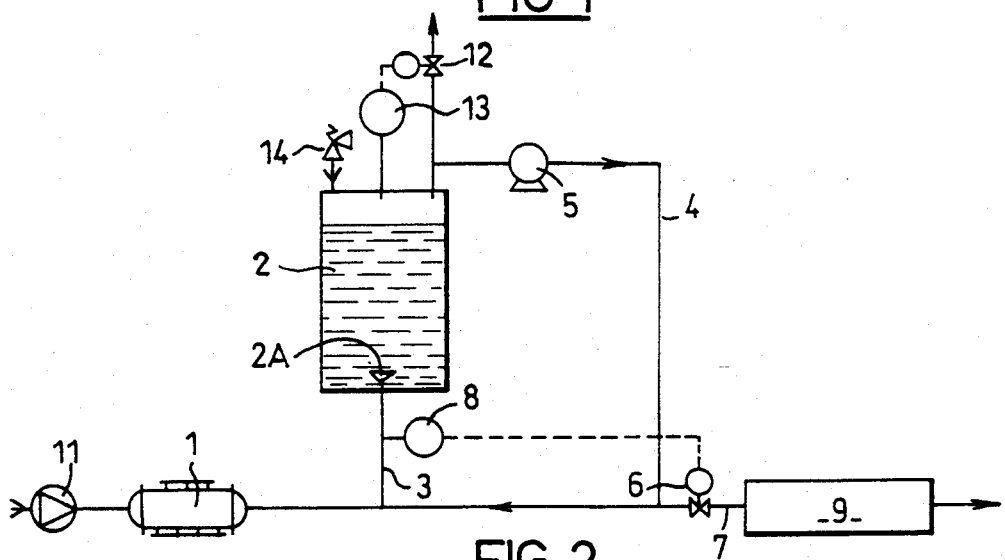
FIG. 2 represents the diagram of a plant of the same type as above in which means for pressurising the ozonisation reactor are provided.
Figure 3:
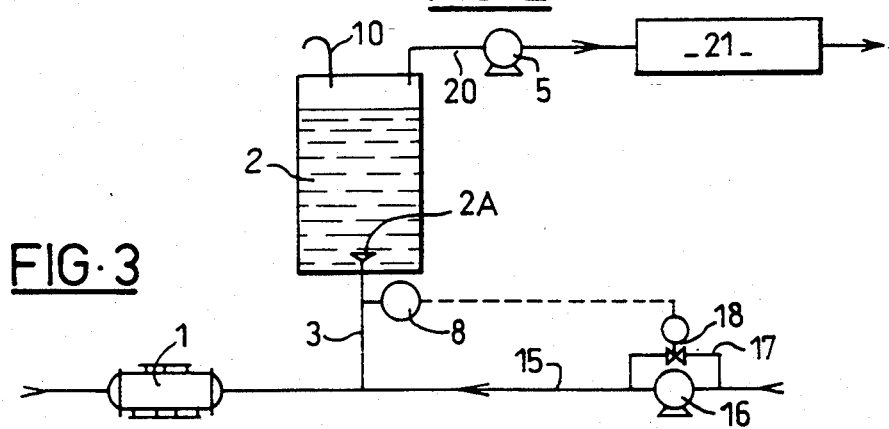
FIG. 3 represents the diagram of a plant for the use of the process according to the invention, in which the secondary fluid is atmospheric air.

The plants represented in FIG. 1 to 3 are used especially for disinfecting waters to be made drinkable.

In the plants illustrated, the ozoniser operates at a fixed flowrate.

The plant represented in FIG. 1 comprises an ozoniser 1 whose inlet is connected to an oxygen source, for example an air separator, not shown, operating, for example, according to the principle of adsorption at variable pressure (Pressure Swing Adsorption or PSA).

The outlet of the ozoniser 1 is, moreover, connected to the inlet of an ozonisation reactor 2, consisting of a bubble column, by means of a supply pipe 3.

The bubble column consists, for example, of a closed concrete tank comprising 4 to 5 compartments containing the fluid to be treated.

The plant also comprises means for injecting vent gas from the reactor, comprising means for recycling part of the vent gas which consists of a pipe 4 connecting the top of the reactor 2 to the supply pipe 3 and equipped with a pumping device 5 operating at a constant speed.

The plant represented in FIG. 1 additionally comprises a valve 6, provided in a pipe 7 for discharging the excess vent gas. This valve is controlled by a device for controlling the flowrate of the gas entering the reactor 2, arranged at the inlet of this reactor.

The discharge pipe 7 is equipped with an ozone destroyer 9.

The ozonisation column 2 additionally comprises an inverted J-vent 10 for maintaining atmospheric pressure in the reactor 2.

In the plant represented, air enriched in oxygen containing at least 70% of oxygen, provided, for example, by the unshown air separator, is conveyed to the ozoniser 1, where ozone is generated from the oxygen of the supply gas. The gas leaving the ozoniser 1 has an ozone content greater than 2% by weight, especially between 2 and 20% by weight.

A secondary gas flow consisting of part of the vent gas from the reactor 2, recycled by means of the pumping device 5 through the pipe 4, is added to the ozonised gas flow exiting from the ozoniser 1.

The two combined gas flowrates constituting the diluted ozonised gas are conveyed to the reactor 2, where they are brought into contact with the waste waters to be treated circulating in the reactor 2 by virtue of one or a number of suitable diffusers 2A.

Part of the volume of the diluted ozonised gas, for example 20 to 30% of this gas, dissolves in the waste waters to be treated where gas absorption and desorption phenomena take place.

There is thus recovered, at the outlet of the reactor 2, a flow of gas which is impoverished in ozone and which has a flowrate slightly less than that entering the reactor.

Part of this gas flow is recycled and constitutes the secondary fluid for diluting the ozonised gas exiting from the ozoniser 1.

The excess vent gas flow is discharged via the discharge pipe 7 and released to atmosphere after destruction of the ozone in the ozone destroyer 9.

If the gas flowrate exiting from the ozoniser 1 varies, the secondary gas flowrate is automatically adjusted by means of the valve 6, controlled by the device 8 for controlling the flowrate which determines the total flowrate of the flow containing oxygen, ozone and the recycled secondary gas. The valve 6 makes it possible to discharge a more or less large amount of secondary gas depending on whether the gas flowrate as the means 8 for controlling the flowrate is reduced or increased.

In the event of accidental overpressurisation in the reactor 2, the inverted J-vent 10 allows the excess gas to escape to atmosphere whereas, in the event of partial vacuum, atmospheric air can enter via the inverted J-vent and reestablish atmospheric pressure in the reactor 2.

By way of example, the gas flowrates can be the following:
gas flowrate at the outlet of the ozoniser: 100 Nm$^3$/h, at an ozone concentration of 10%,
gas flowrate at the inlet of the reactor: 1000 Nm$^3$/h, at an ozone concentration of 1%,
gas flowrate at the outlet of the reactor: 800 Nm$^3$/h, at a low ozone concentration,
flowrate of extra atmospheric gas: 100 Nm$^3$/h through the reactor.

As a variant, the plant represented in FIG. 1 contains Venturi-type means for adding the two gas flows.

The plant represented in FIG. 2 is of the same type as that in FIG. 1 but additionally contains means for pressurising the reactor 2.

Thus, the plant comprises a compressor 11 arranged upstream (or, in a variant, downstream) of the ozoniser 1 as well as means for regulating the pressure of the reactor 2 consisting of an exhaust valve 12 controlled by a device 13 for controlling the pressure. It is also provided with an anti-partial-vacuum safety valve 14.

When the pressure rises above the desired pressure, the valve 12 makes it possible for the excess gas to be exhausted, whereas, when an accidental partial vacuum is produced in the reactor, atmospheric air enters via the valve 14 to prevent the reactor being maintained at partial vacuum.

It is additionally possible to provide an ozone destroyer, not shown, at the outlet of the valve 12, in order to eject to atmosphere gas no longer containing ozone, or containing trace amounts of ozone.

The plant represented in FIG. 2 operates in the same way as that in FIG. 1, save the fact that the reactor, the ozonised gas, the diluted ozonised gas and the vent gas are under pressure.

In the device represented, the reactor is pressurised via a compressor. However, the ozoniser can, to achieve the same result, be connected to a gas source enriched in oxygen itself under pressure, such as a storage tank.

The plant represented in FIG. 3 comprises, as above, an ozoniser 1, an ozonisation reactor 2 and a supply pipe 3 connecting the ozoniser 1 to the inlet of the reactor 2 and equipped with a device 8 for controlling the flowrate of diluted ozonised gas arranged at the inlet of the reactor 2.

The ozonised gas exiting from the ozoniser 1 via the supply pipe 3 is here diluted by means of atmospheric air brought via an admission pipe 15 equipped with a device 16 for pumping atmospheric air operating at a constant rate.

In order to regulate the flowrate of the atmospheric air, the terminals of the pumping device 16 are connected via a by-pass 17 containing a valve 18 controlled by the device 8.

In this plant, the vent gas is evacuated via the pumping device 5 through a discharge pipe 20 and released to atmosphere after passing through a ozone destroyer 21 which is of larger size than the ozone destroyer 9 represented in FIG. 1 and 2, insofar as it has to treat all the vent gas flowrate.

As a variant, in the plants of FIG. 1, 2 and 3, the pumping devices could be variable in speed, the means for regulating the secondary gas flow then being consequently modified.

In the case where the process according to the invention is applied to a fluid, the latter can consist of a mixture, for example of crude water to which hydrogen peroxide has been added.

The process according to the invention has the advantage of making possible the generation of highly concentrated ozone which thus provides an optimum yield of the ozoniser, while providing good homogenisation of the dissolved gas in the fluid to be treated by virtue of the addition of a secondary gas flowrate which can be adjusted to the flowrate of the gas provided by the ozoniser.

What is claimed is:

1. A process for treating waters, to be made drinkable, with ozone in a reactor, said process comprising the steps of generating ozone in a gas enriched in oxygen and containing at least 70% of oxygen by volume, to produce an ozonised gas containing more than 2% of ozone by weight; diluting said ozonised gas by means of a secondary fluid; contacting the waters with the diluted ozonized gas; and venting from the reactor ozone-poor reacted gas released during said contacting step; in which process the secondary fluid comprises part or all of the ozone-poor reacted gas vented from said reactor (2).

2. A process for treating waters, to be made drinkable, with ozone in a reactor, said process comprising the steps of generating ozone in a gas enriched in oxygen and containing at least 70% of oxygen by volume, to produce an ozonised gas containing more than 2% of ozone by weight; diluting said ozonised gas by means of a secondary fluid; contacting the waters with the diluted ozonized gas; and venting from the reactor ozone-poor reacted gas released during said contacting step; in which process part of the vented gas from the reactor (2) is recycled as said secondary fluid in order to dilute the ozonised gas, the remainder of the vented gas being discharged into the atmosphere.

3. Process according to claim 1, in which the discharged vent gas is treated by an ozone destroyer (9).

4. A process for treating fluids with ozone in a reactor, said process comprising the steps of:

producing an ozone-containing gas from a gas enriched in oxygen;

diluting the ozone-containing gas with a secondary fluid;

contacting the fluid to be treated with a flow of the diluted gas;

venting from the reactor ozone-poor reacted gas released during said contacting step; and discharging at least a portion of the vented gas into the atmosphere.

5. The process according to claim 4, further comprising the step of recycling at least a portion of the ozone-poor reacted gas as at least a portion of said secondary fluid used in said diluting step.

6. The process according to claim 4, further comprising the step of treating the discharged vented gas with an ozone destroyer.

7. The process according to claim 4, wherein the oxygen-enriched gas contains at least 70% of oxygen by volume, and wherein the produced ozonized gas contains more than 2% of ozone by weight.

* * * * *